United States Patent
Sun et al.

(10) Patent No.: US 11,368,935 B2
(45) Date of Patent: Jun. 21, 2022

(54) MONITORING FOR A PAGING SIGNAL BASED ON A COUNTER

(71) Applicant: QUALCOMM INCORPORATED, San Diego, CA (US)

(72) Inventors: Jing Sun, San Diego, CA (US); Pravjyot Singh Deogun, Bengaluru (IN); Ozcan Ozturk, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/948,677

(22) Filed: Sep. 28, 2020

(65) Prior Publication Data

US 2021/0160815 A1 May 27, 2021

(30) Foreign Application Priority Data

Nov. 21, 2019 (IN) .............................. 201941047552

(51) Int. Cl.
*H04W 76/28* (2018.01)
*H04W 68/00* (2009.01)
*H04W 24/08* (2009.01)
*H04W 72/04* (2009.01)

(52) U.S. Cl.
CPC ......... *H04W 68/005* (2013.01); *H04W 24/08* (2013.01); *H04W 72/042* (2013.01); *H04W 76/28* (2018.02)

(58) Field of Classification Search
CPC . H04W 68/005; H04W 24/08; H04W 72/042; H04W 76/28; H04W 48/16; H04W 48/12; H04W 52/0216; Y02D 30/70
See application file for complete search history.

(56) References Cited

U.S. PATENT DOCUMENTS

| | | | |
|---|---|---|---|
| 2011/0199910 A1* | 8/2011 | Oh | H04W 52/0216 370/241 |
| 2018/0352604 A1* | 12/2018 | Vajapeyam | H04W 76/28 |
| 2021/0127358 A1* | 4/2021 | Li | H04B 7/0626 |
| 2021/0266896 A1* | 8/2021 | Choi | H04L 5/0098 |

FOREIGN PATENT DOCUMENTS

| | | | | |
|---|---|---|---|---|
| EP | 2984892 A2 * | 2/2016 | | H04W 72/1273 |
| EP | 2984892 A2 | 2/2016 | | |
| EP | 3836670 A1 * | 6/2021 | | H04W 56/001 |
| WO | 2018202693 | 11/2018 | | |

OTHER PUBLICATIONS

International Search Report and Written Opinion—PCT/US2020/053350—ISA/EPO—dated Jan. 29, 2021.

* cited by examiner

*Primary Examiner* — Said M Elnoubi
(74) *Attorney, Agent, or Firm* — Haynes and Boone, LLP (57) ABSTRACT

Wireless communications systems and methods related to monitoring a paging signal are provided. A wireless communication device may receive a first system information signal from a base station (BS) and may configure a counter with an initial counter value in response to receiving the first system information signal. Additionally, the wireless communication device may receive a second system information signal from the BS and may modify the counter value of the counter in response to receiving the second system information signal. The wireless communication device may monitor for a paging signal from the BS while the counter is outstanding.

29 Claims, 6 Drawing Sheets

MONITORING FOR A PAGING SIGNAL BASED ON A COUNTER

CROSS REFERENCE TO RELATED APPLICATIONS

The present application claims priority to and the benefit of Indian Provisional Patent Application No. 201941047552, filed Nov. 21, 2019, which is hereby incorporated by reference in its entirety as if fully set forth below and for all applicable purposes.

TECHNICAL FIELD

The technology discussed in this disclosure relates generally to wireless communication systems, and more particularly to monitoring for a paging signal based on a paging monitoring counter. Aspects may enable and provide solutions and techniques for reducing power consumption and improving the probability of successful transmissions by the base station (BS) to the user equipment (UE).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may perform LBT to determine whether there are active transmissions in the channel. If the LBT results in a LBT pass, the transmitting node may transmit a preamble to reserve a channel occupancy time (COT) in the shared channel and may communicate with a receiving node during the COT.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of the present disclosure provide techniques for monitoring for paging based on a counter. A user equipment (UE) may receive a first system information signal, the reception of which may trigger the UE to configure a counter with an initial counter value. The first system information signal may include scheduling information for a system information block (SIB). Rather than immediately cease monitoring for paging after receiving the first system information signal, the UE may use the counter as a "grace period" to continue to monitor for a paging signal. The UE may receive a second system information signal subsequent to receiving the first system information signal. The UE may add additional physical downlink control channel (PDCCH) occasions for paging monitoring by increasing the counter value by a particular amount in response to receiving the second system information signal. The UE may continue to monitor for paging from the BS while the counter is outstanding.

For example, in an aspect of the disclosure, a method of wireless communication includes receiving, by a user equipment (UE) from a base station (BS), a first system information signal; configuring, by the UE, a counter with an initial counter value in response to receiving the first system information signal; receiving, by the UE from the BS, a second system information signal; modifying, by the UE, the counter value of the counter in response to receiving the second system information signal; and monitoring, by the UE, for a paging signal from the BS while the counter is outstanding.

In an additional aspect of the disclosure, an apparatus includes a transceiver configured to: receive, by a user equipment (UE) from a base station (BS), a first system information signal; and receive, by the UE from the BS, a second system information signal; and a processor configured to: configure, by the UE, a counter with an initial counter value in response to receiving the first system information signal; modify, by the UE, the counter value of the counter in response to receiving the second system information signal; and monitor, by the UE, for a paging signal from the BS while the counter is outstanding.

In an additional aspect of the disclosure, a computer-readable medium includes program code recorded thereon, the program code including code for causing a wireless communication device to receive a first system information signal from a base station (BS); code for causing the wireless communication device to configure a counter with an initial counter value in response to receiving the first system information signal; code for causing the wireless communication device to receive a second system information signal from the BS; code for causing the wireless communication device to modify the counter value of the counter in response to receiving the second system information signal; and code for causing the wireless communication device to monitor for a paging signal from the BS while the counter is outstanding.

In an additional aspect of the disclosure, an apparatus includes means for receiving a first system information signal from a base station (BS); means for a counter with an initial counter value in response to receiving the first system information signal; means for receiving a second system information signal from the BS; means for modifying the counter value of the counter in response to receiving the second system information signal; and means for monitoring for a paging signal from the BS while the counter is outstanding.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

A BS may transmit paging information and system information in a shared radio frequency band (e.g., an unlicensed frequency band) during a channel occupancy time (COT). The UE may be configured with physical downlink control channel (PDCCH) monitoring occasions (e.g., at certain time periods). The UE may monitor for a paging schedule from the network during a monitoring occasion. Paging is a mechanism that notifies the UE when the BS has a paging message for the UE, for example, while the UE is in an idle mode. The UE may decode the content of the paging message and initiate any applicable procedures for processing the content. The UE may monitor for a paging schedule in, for example, a Type-0 PDCCH search space or a Type-2 PDCCH search space.

The BS may perform LBT prior to transmitting in a channel Due to the LBT constraint, the BS may be unable to broadcast system information associated with the network if the LBT results in an LBT fail. The LBT constraint may lead to a lower probability of transmission success for broadcast channels (e.g., paging) and/or a delay in the transmission. To increase the likelihood that the BS is able to transmit broadcast channels, the number of PDCCH monitoring occasions may be increased for monitoring for a paging occasion. The UE monitors for a paging schedule in the number of PDCCH monitoring occasions. The increase in the number of PDCCH monitoring occasions may result in more paging schedule transmission opportunities by the BS. For example, the BS may acquire the channel and have a higher likelihood of transmitting a paging schedule immediately when the channel transmission is successful. The number of additional opportunities may be proportional to congestion in the channel and a maximum COT supported (e.g., a monitoring occasion may extend up to a 5-ms period or more).

By increasing the number of PDCCH monitoring occasions, the UE may increase its power consumption as a result of monitoring the increased number of PDCCH monitoring occasions. The present application provides techniques for improving power savings when monitoring, by the UE, for paging from the BS. For example, the UE may enter a power saving mode when the UE determines to cease monitoring for paging from the BS.

Additionally, the bandwidth for transmission of a schedule for system information (e.g., system information radio network temporary identifier (SI-RNTI) based-PDCCH, remaining system information (RMSI), etc.) and a schedule for a paging message may be insufficient during a particular PDCCH monitoring occasion. The BS may be unable to multiplex the paging scheduling information with the system information scheduling information within the same PDCCH monitoring occasion. If the BS has insufficient resources to transmit both the system information scheduling information and the paging scheduling information, the BS may prioritize the transmission of the system information schedule information over the transmission of the paging scheduling information to the UE. The BS may attempt to transmit the paging scheduling information during a subsequent PDCCH monitoring occasion (after the BS has transmitted any pending system information scheduling information waiting to be transmitted). Accordingly, if the UE is monitoring PDCCH monitoring occasions and receives system information scheduling information (e.g., SI-RNTI PDCCH) during a PDCCH monitoring occasion, the UE may determine to wait a grace period after receiving the system information for a paging.

After the BS 105 transmits a schedule for system information in a search space (e.g., Type-0 PDCCH search space or a Type-2 PDCCH search space), the BS may transmit system information according to the system information schedule. Similarly, after the BS transmits a schedule for a paging message in a search space, the BS may transmit paging according to the paging schedule. The UE may determine to not cease monitoring for paging immediately after receiving a system information signal (e.g., PDCCH reception for a SIB) because the BS may transmit a paging signal within the grace period. For example, the BS may have both the system information signal and the paging signal to transmit, may prioritize the transmission of the system information signal before the paging signal, and then may transmit a paging signal during the grace period. The UE may monitor for a paging signal from the BS based on a counter, using the counter as a mechanism for determining the grace period.

The present application provides techniques for configuring and/or modifying the counter based on reception of a system information signal. The UE uses the counter as a mechanism for determining when to cease monitoring for a paging signal from the BS.

Aspects of the present disclosure can provide several benefits. For example, power efficiency at the UE may be improved by entering a power saving mode when the counter expires. Additionally, the UE may have an improved probability of receiving a system information signal (e.g., a schedule for system information) based on the increased number of PDCCH occasions. The UE may also have an improved probability of receiving a paging signal (e.g., schedule for a paging message or the paging message) from the BS based on continuing to monitor for the paging signal using the counter.

Figure 1:
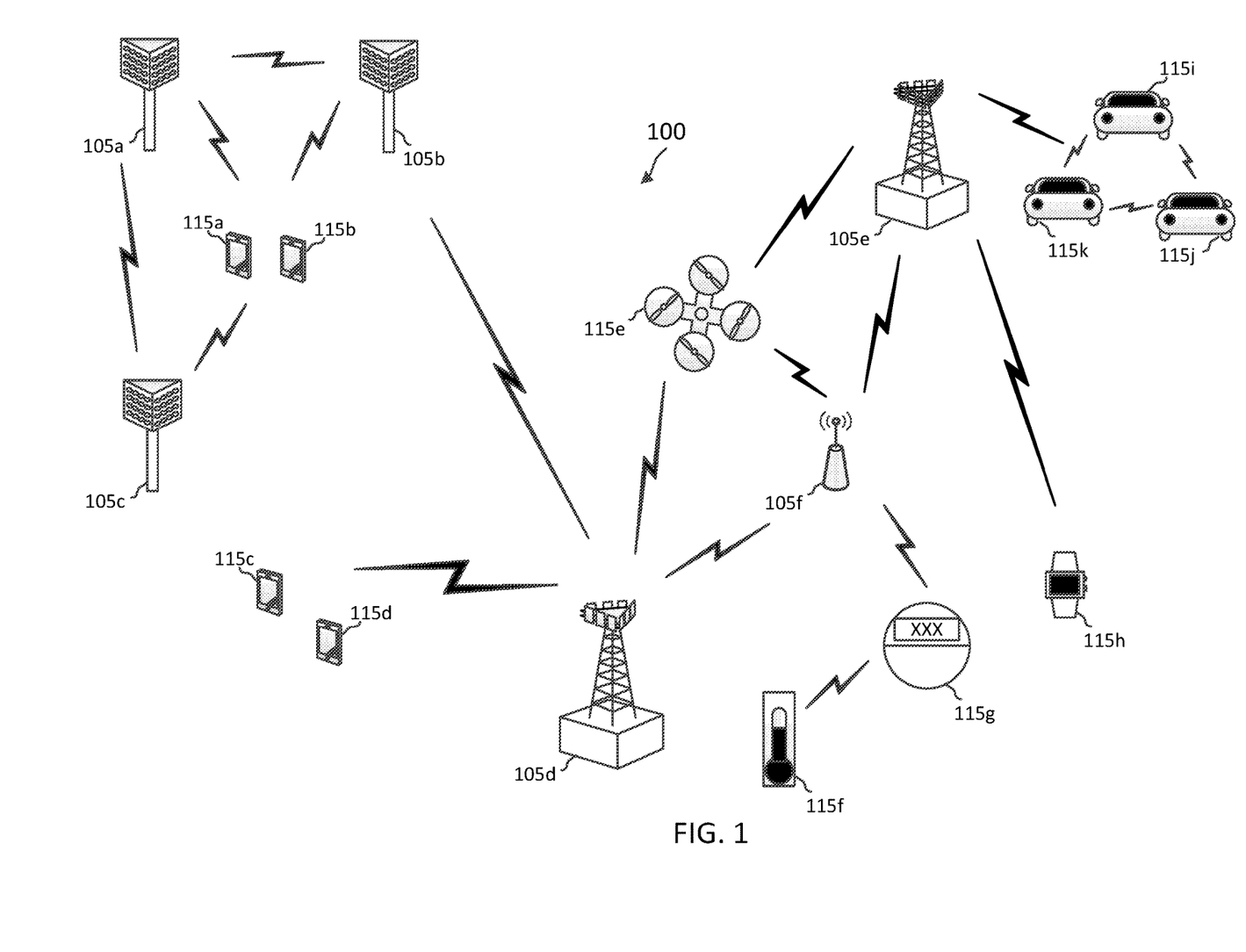
FIG. 1 illustrates a wireless communications network according to one or more aspects of the present disclosure.

FIG. 1 illustrates a wireless communication network 100 according to one or more aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicleto-vehicle (V2V) communications among the UEs 115i-115k, vehicle-to-everything (V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. A subframe may also be referred to as a slot. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), RMSI, and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIB s). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS. In some aspects, SIB1 may contain cell access parameters and scheduling information for other SIBs.

After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. In some aspects, the BS 105 may communicate with a UE 115 using HARQ techniques to improve communication reliability, for example, to provide a URLLC service.

The network 100 may be an NR network deployed over a licensed spectrum. The network 100 may operate over a shared channel, which may include shared frequency bands or unlicensed frequency bands, for example, at about 3.5 gigahertz (GHz), sub-6 GHz or higher frequencies in the mmWav band. In some aspects, a wireless communication device may share resources in the shared communication medium and may employ a listen-before-talk (LBT) procedure to acquire a channel occupancy time (COT) in the shared medium for communications. COTs may be non-continuous in time and may refer to an amount of time a station can send frames when it has won contention for the wireless medium. Each COT may include a plurality of slots and one or more medium sensing periods.

A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. In an example, the wireless communication device is the UE 115. When the LBT results in an LBT pass, the UE 115 may receive DL data and/or system information from the BS 105 and/or may transmit UL data to the BS. In another example, the wireless communication device is the BS 105. When the LBT results in an LBT pass, the BS 105 may schedule a UE 115 for communications over the shared channel during the COT and/or may transmit DL data and/or system information (e.g., any system information whose PDCCH is identified by identified by SI-RNTI, which schedules RMSI, OSI, and/or a SIB) to the UE 115.

The UE 115 may monitor a Type-0 PDCCH search space and/or a Type-2 PDCCH search space. The UE 115 may monitor the search space (e.g., Type-0 PDCCH or Type-2 PDCCH) for DCI (scheduling of UL or DL data) and may receive system information and/or paging transmissions based on the scheduling. The Type-0 PDCCH search space may include a number of time-frequency occasions where the UE 115 is expected to monitor for a DL message (e.g., PDCCH DCI) from the BS 105. For example, the Type-0 PDCCH search space may be used for scheduling of system information or scheduling of a paging message, and the UE 115 may receive system information (e.g., RMSI) or paging in the Type-0 PDCCH based on the respective schedules. The DCI for paging may be based on P-RNTI based-PDCCH. The Type-2 PDCCH search space may be configured to receive only paging scheduling messages, and the UE 115 may receive P-RNTI PDCCH in the Type-2 PDCCH. The BS 105 may configure the UE 115 to monitor the Type-0 PDCCH search space and the Type-2 PDCCH search space for paging via RRC configuration. The UE 115 may monitor the Type-0 PDCCH search space by default for paging if the Type-2 PDCCH search space is not configured; otherwise the UE 115 may monitor the Type-2 PDCCH search space only for paging. After the BS 105 transmits a schedule for system information in a Type-0 PDCCH search space, the BS 105 may transmit system information according to the system information schedule. Similarly, after the BS 105 transmits a schedule for paging in a Type-0 PDCCH search space, the BS 105 may transmit paging according to the paging schedule. The present disclosure may use the term "system information signal" or "system information" to refer to any signal related to system information including the scheduling information. Additionally, the present disclosure may use the term "paging signal" or "paging" to refer to any signal related to paging including the paging schedule.

If the BS 105 has insufficient resources to transmit both the system information signal and the paging signal, the BS 105 may prioritize the transmission of the system information signal over the transmission of the paging signal to the UE 115. The BS 105 may attempt to transmit the paging signal (e.g., schedule for a paging message) during a subsequent PDCCH monitoring occasion (after the BS 105 has transmitted any pending schedules for system information waiting to be transmitted). Accordingly, if the UE 115 is monitoring PDCCH monitoring occasions and receives a system information signal (e.g., SI-RNTI PDCCH) during a PDCCH monitoring occasion, the UE 115 may determine to wait a grace period after receiving the system information signal for a paging signal from the BS.

Figure 2:
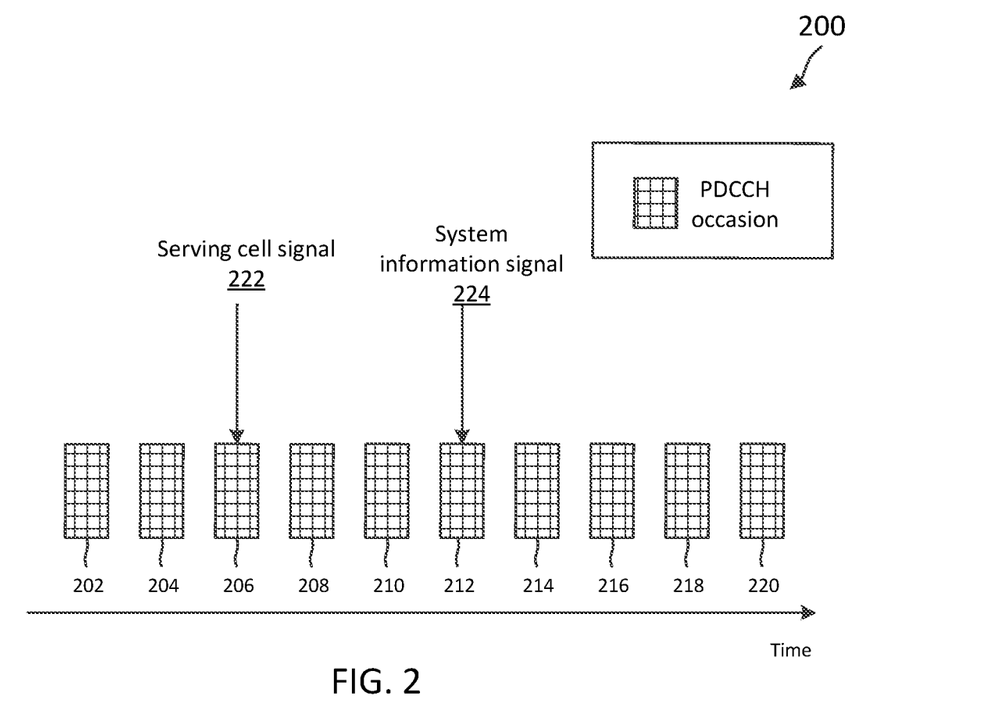
FIG. 2 illustrates a scheduling/transmission configuration method for physical downlink control channel (PDCCH) monitoring occasions according to one or more aspects of the present disclosure.

The present application provides techniques for determining the grace period and how to configure the grace period. FIG. 2 illustrates a scheduling/transmission configuration method 200 for PDCCH monitoring occasions according to one or more aspects of the present disclosure. The scheduling/transmission configuration method 200 may be employed by BSs such as the BSs 105 and UEs such as the UEs 115 in a network such as the network 100 for communications. In particular, the BS 105 may communicate with the UE 115 using time-frequency resources configured as shown in the scheduling/transmission configuration method 200. In FIG. 2, the x-axis represents time in some arbitrary units.

In the scheduling/transmission configuration 200, the BS 105 may configure the UE 115 with PDCCH occasions in a search space (e.g., Type-0 PDCCH search space or Type-2 PDCCH search space). The UE 115 may monitor the PDCCH occasions 202, 204, 206, 208, 210, 212, 214, 216, 218, and 220. Before each PDCCH occasion, the BS 105 may perform a LBT. If the LBT results in an LBT pass, the BS 105 may transmit a serving cell signal to one or more UEs 115. Based on a LBT fail, the BS 105 may be unable to transmit a serving cell signal (e.g., PDCCH for a SIB) during the PDCCH occasions 202 and 204. Based on a subsequent LBT pass, the BS 105 may transmit a serving cell signal 222 (e.g., PDCCH for a SIB) during the PDCCH occasion 206. The serving cell signal 222 may be any system information whose PDCCH is identified by SI-RNTI. For example, the serving cell signal 222 may be scheduling information for RMSI PDCCH, OSI, SIB, SSB, GC-PDCCH, a SFI signal, a COT indication signal, etc.

The UE 115 may detect, based on monitoring the PDCCH occasions, the serving cell signal 222 in the search space during the PDCCH occasion 206. The UE 115 may receive the serving cell signal 222 and configure a paging monitoring counter with a counter value in response to receiving the serving cell signal 222. The paging monitoring counter may also be referred to as a counter in the present disclosure. The counter may be used to count or track the number of PDCCH occasions (in a grace period) where the UE 115 may perform PDCCH monitoring. The value may indicate the number of remaining PDCCH occasions before the UE 115 ceases PDCCH monitoring. For example, each increment to the counter value may provide the UE 115 with one or more additional PDCCH occasions before the UE 115 ceases the monitoring, and each decrement to the counter value may provide the UE 115 with one or more fewer PDCCH occasions before the UE 115 ceases the monitoring.

The UE 115 may define the counter and may continue to monitor for a paging signal based on the counter value. For example, the UE 115 may monitor for a paging signal (e.g., PDCCH for a paging schedule) in, for example, Type-0 PDCCH search space and/or Type-2 PDCCH search space while the counter is outstanding. A counter is outstanding if the counter has not reached zero (if the counter has not expired). A counter has expired if the counter has counted down to zero. The reception of the serving cell signal 222 by the UE 115 may trigger the UE 115 to start the counter. The UE 115 may determine that the BS 105 has acquired a COT based on receiving the serving cell signal 222 and may start the grace period for monitoring PDCCH occasions for a paging signal using the counter.

Based on a LBT fail, the BS 105 may be unable to transmit a serving cell signal during the PDCCH occasions 208 and 210. With each subsequent monitored PDCCH occasion after the PDCCH occasion 206 during which the service cell signal 222 was detected, the UE may decrement the counter value. For example, if the UE 115 configures the counter with a counter value of X in response to receiving the serving cell signal 222, the UE 115 may update the counter value by decrementing a current counter value of the counter by one. In this example, the counter value of the counter may be updated to (X−1) based on monitoring the PDCCH occasion 208. Similarly, the counter value of the counter may be updated to (X−2) based on monitoring the PDCCH occasion 210.

At a later point in time, the BS 105 may perform a LBT before PDCCH occasion 212. Based on a LBT pass, the BS 105 may transmit a system information signal 224. For example, the BS 105 may broadcast the system information signal 224 to a group of UEs 115. The system information signal 224 may be, for example, based on SI-RNTI PDCCH reception. The UE 115 may receive the system information signal 224 (e.g., schedule for the system information) from the BS 105 during the PDCCH occasion 212. The UE 115 may modify the counter value in response to receiving the system information signal 224. The UE 115 may modify the counter value using a variety of techniques. For example, the UE 115 may modify the counter value by resetting the updated counter to the initial counter value (see FIG. 5), may modify the counter value by resetting the updated counter to the current counter value (see FIG. 6), or may modify the counter value by incrementing the updated counter value based on a number of DL beams associated with at least one of the serving cell signal 222 or the system information signal 224 (see FIG. 7). Each of these techniques will be discussed in more detail below.

After the counter is modified in response to receiving the system information signal 224, the UE 115 may continue to update the counter value by decrementing a current counter value of the counter by one. Accordingly, the counter value is decremented starting from the modified counter value. The UE 115 may monitor for a paging signal from the BS 105 while the counter is outstanding. The UE 115 may cease monitoring for a paging signal from the BS when the counter expires. The UE 115 may enter a power saving state in response to ceasing to monitor for a paging signal. The power saving state may be, for example, a discontinuous reception (DRX) sleep state. Discontinuous reception (DRX) is a technique in which a UE may be in DRX inactive time or DRX active time during a DRX cycle. While operating in the DRX mode, the UE may enter a sleep mode for a certain period of time and enter a wake mode for another period of time. The DRX inactive time allows the UE to power down certain radio components or at least switch certain radio components to a lower power state than when in an active state. Accordingly, the use of DRX can provide power savings at the UE.

In some aspects, the UE 115 may receive a paging signal (e.g., a schedule for a paging message or a paging message) while the counter is outstanding. The UE 115 may cease to monitor for a paging signal from the BS in response to receiving the paging signal while the counter is outstanding.

In some aspects, the UE 115 configures the counter if the UE 115 is monitoring for a paging signal in the Type-0 PDCCH search space, but not in the Type-2 PDCCH search space. For example, if the UE 115 is monitoring for a paging signal from the BS in the Type-2 PDCCH, the UE 115 is not triggered to configure the counter. In some aspects, the UE 115 configures the counter if the UE 115 is monitoring for a paging signal in the Type-0 PDCCH search space and/or the Type-2 PDCCH search space. In some aspects, the UE 115 ceases to monitor for a paging signal immediately after receiving P-RNTI PDCCH.

Figure 3:
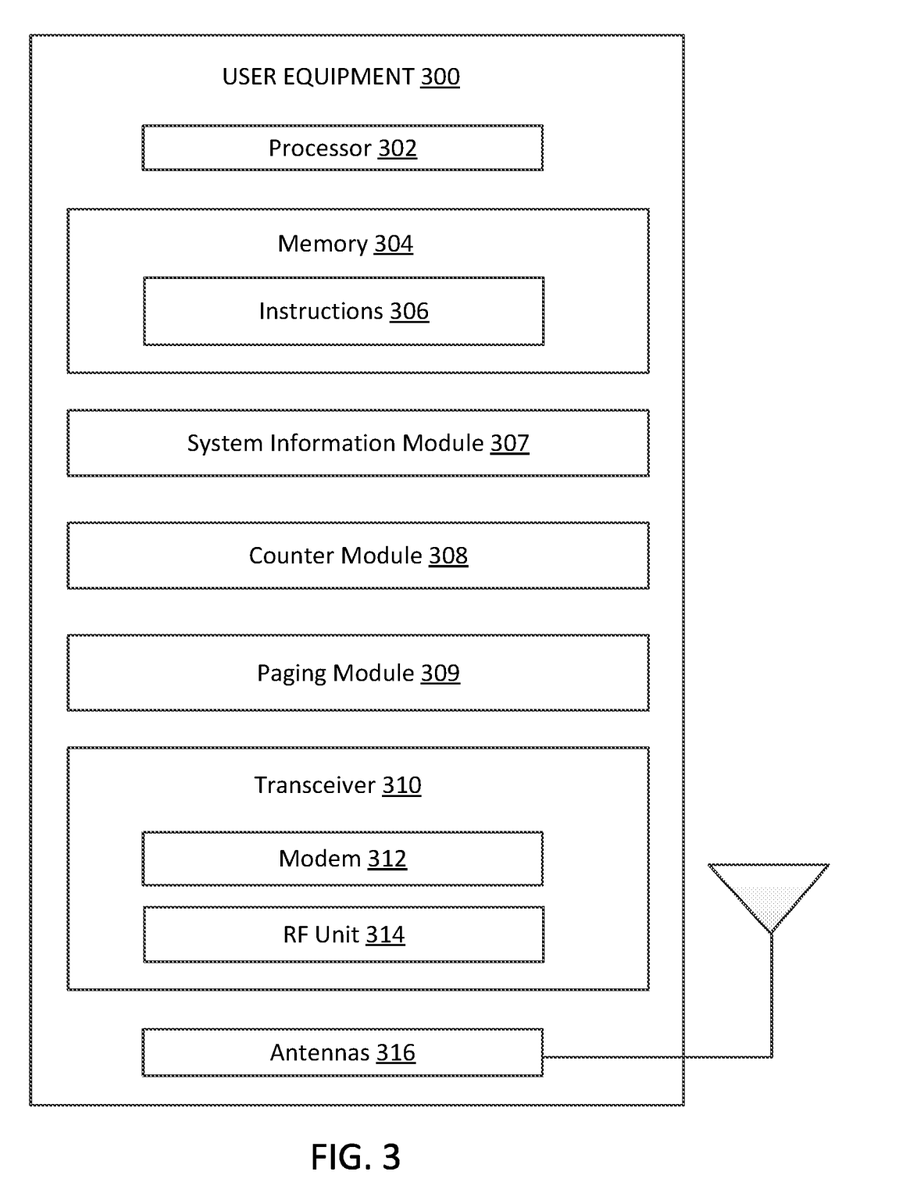
FIG. 3 is a block diagram of a user equipment (UE) according to one or more aspects of the present disclosure.

FIG. 3 is a block diagram of a UE 300 according to one or more aspects of the present disclosure. The UE 300 may be a UE 115 discussed above in FIG. 1. As shown, the UE 300 may include a processor 302, a memory 304, a system information module 307, a counter module 308, a paging module 309, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with aspects of the present disclosure, for example, aspects of FIGS. 1-3 and 5-8. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The system information module 307, the counter module 308, and/or the paging module 309 may be implemented via hardware, software, or combinations thereof. The system information module 307, the counter module 308, and/or the paging module 309 may be implemented as a processor, circuit, and/or instructions 306 stored in the memory 304 and executed by the processor 302. In some instances, the system information module 307, the counter module 308, and/or the paging module 309 can be integrated within the modem subsystem 312. The system information module 307, the counter module 308, and/or the paging module 309 can be implemented by a combination of software components (e.g., executed by a DSP or a general processor) and hardware components (e.g., logic gates and circuitry) within the modem subsystem 312. The system information module 307, the counter module 308, and/or the paging module 309 may be used for various aspects of the present disclosure, for example, aspects of FIGS. 1-3 and 5-8.

In some aspects, the system information module 307 may be configured to detect or receive a first system information signal from a BS. The first system information signal may correspond to the serving cell signal 222 in FIG. 2. The first system information signal may be, for example, PDCCH for a SIB. The UE 115 may receive one or more system information blocks (e.g., any system information whose PDCCH is identified by SI-RNTI). The system information module 307 may receive the serving cell signal 222 (e.g., system information) during the PDCCH occasion 206.

In some aspects, the counter module 308 may be configured to configure a counter with an initial counter value in response to receiving the first system information signal (e.g., serving cell 222). In some aspects, the system information module 307 may be configured to receive a second system information signal from the BS. The second system information signal may correspond to the system information signal 224 in FIG. 2. For example, the UE 115 may receive the second system information signal (e.g., system information signal 224) during the PDCCH occasion 212. In some aspects, the counter module 308 may be configured to modify the counter value of the counter in response to receiving the second system information signal. In some aspects, the paging module 309 may be configured to monitor for a paging signal from the BS while the counter is outstanding. The paging module 309 may be configured to monitor PDCCH for a paging signal. A system information signal may include, for example, PDCCH for a SIB. Additionally, a paging signal may include at least one of PDCCH for a paging message or a paging message.

As shown, the transceiver 310 may include the modem subsystem 312 and the RF unit 314. The transceiver 310 can be configured to communicate bi-directionally with other devices, such as the BSs 105 or BS 400. The modem subsystem 312 may be configured to modulate and/or encode the data from the memory 304, the tracking module 307, the measurement module 308, and/or the paging module 309 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., system information) to the system information module 307, the counter module 308, and/or the paging module 309 for processing. The antennas 316 may include multiple antennas of similar or different designs in order to sustain multiple transmission links. The RF unit 314 may configure the antennas 316.

In some aspects, the transceiver 310 is configured to receive a system information signal by coordinating with the system information module 307 and/or is configured to receive a paging signal by coordinating the paging module 309. In some aspects, the UE 300 can include multiple transceivers 310 implementing different radio access technologies (RATs) (e.g., NR and LTE). In an aspect, the UE 300 can include a single transceiver 310 implementing multiple RATs (e.g., NR and LTE). In an aspect, the transceiver 310 can include various components, where different combinations of components can implement different RATs.

Figure 4:
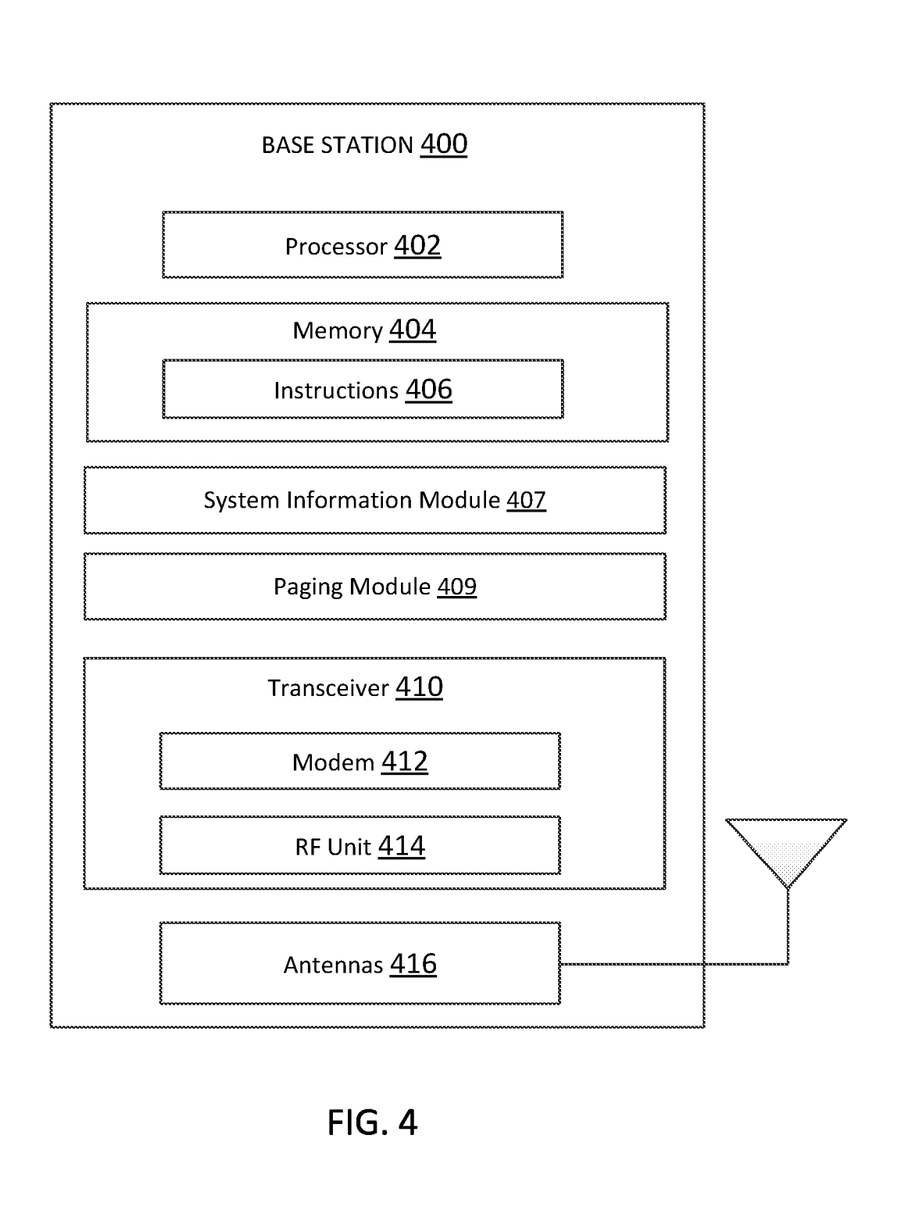
FIG. 4 is a block diagram of a base station (BS) according to one or more aspects of the present disclosure.

FIG. 4 is a block diagram of a BS 400 according to one or more aspects of the present disclosure. The BS 400 may be a BS 105 as discussed above in FIG. 1. As shown, the BS 400 may include a processor 402, a memory 404, a system information module 407, a paging module 409, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 1, 2, and 5-7. Instructions 406 may also be referred to as code, which may be interpreted broadly to include any type of computer-readable statement(s) as discussed above with respect to FIG. 3.

The system information module 408 and/or the paging module 409 may be implemented via hardware, software, or combinations thereof. The system information module 408 and/or the paging module 409 may be implemented as a processor, circuit, and/or instructions 406 stored in the memory 404 and executed by the processor 402. In some instances, the system information module 408 and/or the paging module 409 can be integrated within the modem subsystem 412. The system information module 408 and/or the paging module 409 can be implemented by a combination of software components (e.g., executed by a DSP or a general processor) and hardware components (e.g., logic gates and circuitry) within the modem subsystem 412. The system information module 408 and/or the paging module 409 may be used for various aspects of the present disclosure, for example, aspects of FIGS. 1, 2, and 5-7.

In some aspects, the system information module 408 may be configured to transmit system information and/or system information scheduling information (e.g., SI-RNTI PDCCH) during one or more PDCCH monitoring occasions to the UE. A system information signal may include, for example, PDCCH detection for a SIB. In some aspects, the paging module 409 may be configured to transmit a paging signal to the UE 300. For example, the paging module 409 may transmit PDCCH to the UE 300 for paging. The paging module 409 may transmit a paging signal to the UE while a counter that is configured by the UE is outstanding. A paging signal may include at least one of scheduling for a paging message or a paging message.

As shown, the transceiver 410 may include the modem subsystem 412 and the RF unit 414. The transceiver 410 can be configured to communicate bi-directionally with other devices, such as the UEs 115 and/or 300 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., grants, resource allocations, system information, etc.) from the modem subsystem 412 (on outbound transmissions) or of transmissions originating from another source such as a UE 115 and/or UE 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices. The RF unit 414 may correspond to the RF transmit chains included within a transmit chain, as discussed in the present disclosure.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to some aspects of the present disclosure. The antennas 416 may further receive data messages transmitted from other devices and provide the received data messages for processing and/or demodulation at the transceiver 410. The transceiver 410 may provide the demodulated and decoded data to the measurement module 408 for processing. The antennas 416 may include multiple antennas of similar or different designs in order to sustain multiple transmission links.

The transceiver 410 may be configured to transmit system information signals by coordinating with the system information module 408. Additionally, the transceiver 410 may be configured to transmit a paging signal by coordinating with the paging message 409. In some aspects, the BS 400 can include multiple transceivers 410 implementing different RATs (e.g., NR and LTE). In an aspect, the BS 400 can include a single transceiver 410 implementing multiple RATs (e.g., NR and LTE). In an aspect, the transceiver 410 can include various components, where different combinations of components can implement different RATs.

Figure 5:
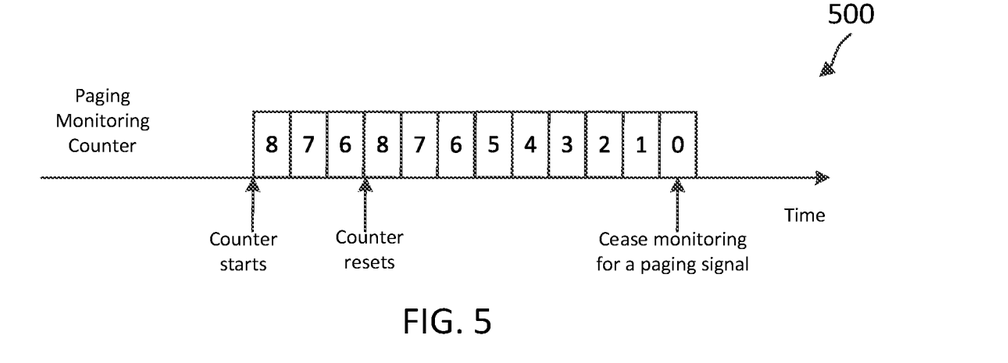
FIG. 5 illustrates a scheduling/transmission configuration method for resetting the counter to an initial counter value according to one or more aspects of the present disclosure.
Figure 6:
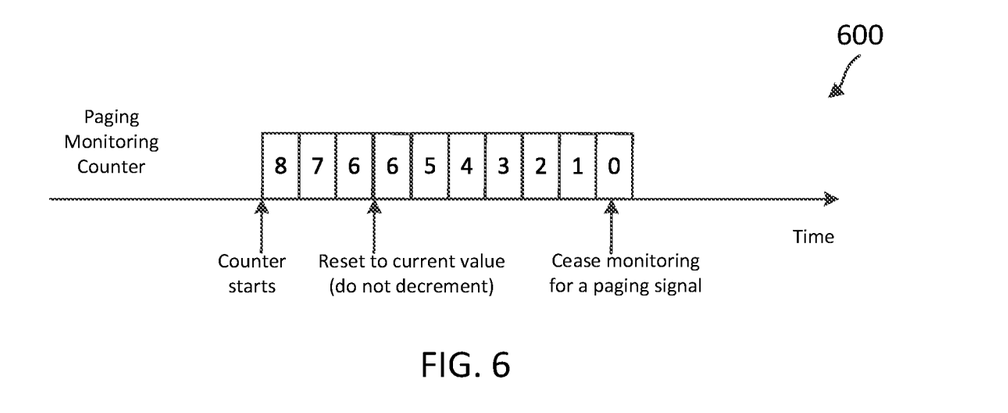
FIG. 6 illustrates a scheduling/transmission configuration method for resetting the counter to a current counter value according to one or more aspects of the present disclosure
Figure 7:
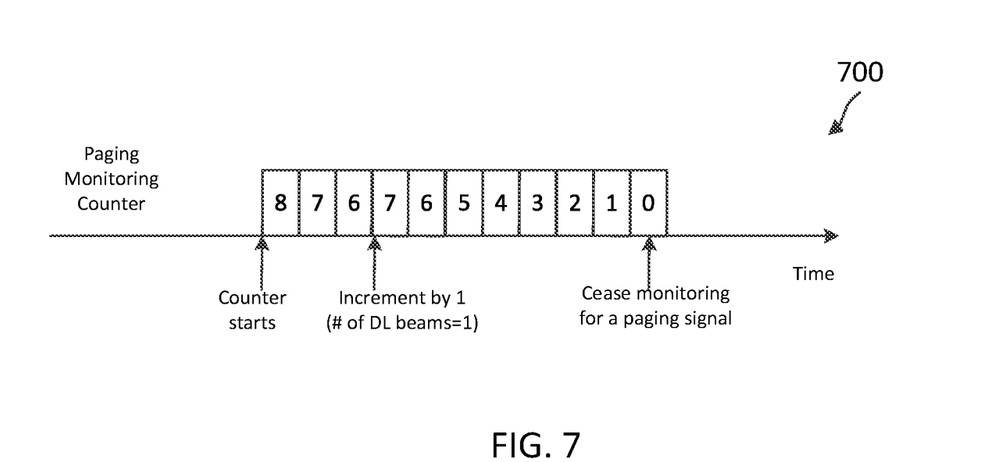
FIG. 7 illustrates a scheduling/transmission configuration method for incrementing the counter based on a number of downlink (DL) beams supported by the BS according to one or more aspects of the present disclosure.

FIGS. 5-7 illustrate scheduling/transmission configuration methods for resetting a paging monitoring counter to a particular value according to one or more aspects of the present disclosure. The UE 115 may configure the paging monitoring counter (counter) with a value of X. In FIGS. 5-7, X is eight. In other aspects, X may be any number greater than one. FIG. 2 and FIGS. 5-7 may be discussed in relation to each other to better understand concepts of the present disclosure.

Additionally, the UE 115 may determine the initial counter value (X) based on a variety of techniques. In some aspects, the BS 105 may configure the initial value of the counter. The initial value of the counter may have a range such as from two to ten, where the initial value of the counter does not exceed ten. For example, the BS 105 may configure the initial value of the counter to be four or six. The BS 105 may configure the counter based on how the BS 105 desires to schedule paging messages. For example, if the BS 105 desires to transmit a paging signal in the next PDCCH occasion after transmitting a first system information signal, the BS 105 may configure the initial value of the counter to be one. In another example, the BS 105 may desire to transmit a paging signal after transmitting a system information signal for all the DL beams (e.g., eight DL beams), then the BS 105 may configure the initial value of the counter to be eight. In some aspects, the initial counter value may be a reference value stored at the UE. For example, the reference value may be hard-coded at the UE (e.g., X=1). In some aspects, UE 115 may determine the initial counter value based on a number of DL beams supported by the BS 105. The number of DL beams allows the BS 105 to transmit RMSI and/or paging messages for other remaining beams.

FIG. 5 illustrates a scheduling/transmission configuration method 500 for resetting the counter to an initial value of the counter according to one or more aspects of the present disclosure. The scheduling/transmission configuration method 500 may be employed by BSs such as the BSs 105 and UEs such as the UEs 115 in a network such as the network 100 for communications. In FIG. 5, the x-axis represents time in some arbitrary units. In FIG. 5, the counter has an initial value of 8. The UE 115 may configure the counter with the initial counter value (e.g., X=8) in response to receiving a first system information signal. The first system information signal may be any signal from a serving cell. For example, the UE may receive the serving cell signal 222 during PDCCH occasion 206 in FIG. 2. For each performed PDCCH monitoring occasion before receiving a subsequent system information signal, the UE 115 may update the counter value by decrementing a current counter value of the counter by one. For example, the UE 115 may decrement the counter value to seven, corresponding to the PDCCH occasion 208 and may decrement the counter value to six corresponding to the PDCCH occasion 210. The updated counter value is six before monitoring PDCCH occasion 212.

The UE 115 modifies the counter value in response to receiving a second system information signal by resetting the updated counter to the initial counter value. The second system information signal may correspond to system information signal 224 in FIG. 2. The UE 115 may reset the current counter value, which was six, to eight, which was the initial counter value of the counter at the start of the counter. Each time the UE 115 receives a system information signal while the counter is outstanding, the UE may modify the counter value by resetting the updated counter to the initial counter value. The UE 115 may continue to monitor for a paging signal from the BS 105 while the counter is outstanding (e.g., is not zero). The UE 115 continues to decrement the counter value as shown in FIG. 5 until the counter value is zero, at which point the counter expires. The UE 115 ceases monitoring for a paging signal in response to the expiration of the counter.

FIG. 6 illustrates a scheduling/transmission configuration method 600 for resetting the counter value to the current counter value according to one or more aspects of the present disclosure. The scheduling/transmission configuration method 600 may be employed by BSs such as the BSs 105 and UEs such as the UEs 115 in a network such as the network 100 for communications. In FIG. 6, the x-axis represents time in some arbitrary units. In FIG. 6, the counter has an initial value of 8. The UE 115 may configure the counter with the initial counter value (e.g., X=8) in response to receiving first system information signal. For each performed PDCCH monitoring occasion before receiving a subsequent system information signal, the UE 115 may update the counter value by decrementing a current counter value of the counter by one. For example, the UE 115 may decrement the counter value to seven, corresponding to the PDCCH occasion 208 and may decrement the counter value to six corresponding to the PDCCH occasion 210. The updated counter value is six before monitoring PDCCH occasion 212.

The UE 115 modifies the counter value in response to receiving a second system information signal by resetting the updated counter to the current counter value. The second system information signal may correspond to system information signal 224 in FIG. 2. The UE 115 may reset the current counter value, which was six, to six. In this example, the UE 115 does not decrement the counter value. Each time the UE 115 receives a system information signal while the counter is outstanding, the UE may modify the counter value by resetting the updated counter to the current counter value. The UE 115 may continue to monitor for a paging signal from the BS 105 while the counter is outstanding (e.g., is not zero). The UE 115 continues to decrement the counter value as shown in FIG. 6 until the counter value is zero, at which point the counter expires. The UE 115 ceases monitoring for a paging signal in response to the expiration of the counter.

FIG. 7 illustrates a scheduling/transmission configuration method 700 for incrementing the counter based on a number of a DL beams supported by the BS according to one or more aspects of the present disclosure. The scheduling/transmission configuration method 700 may be employed by BSs such as the BSs 105 and UEs such as the UEs 115 in a network such as the network 100 for communications. In FIG. 7, the x-axis represents time in some arbitrary units. In FIG. 7, the counter has an initial value of 8. The UE 115 may configure the counter with the initial counter value (e.g., X=8) in response to receiving a first system information signal. For each performed PDCCH monitoring occasion before receiving a subsequent system information signal, the UE 115 may update the counter value by decrementing a current counter value of the counter by one. For example, the UE 115 may decrement the counter value to seven, corresponding to the PDCCH occasion 208 and may decrement the counter value to six corresponding to the PDCCH occasion 210. The updated counter value is six before monitoring PDCCH occasion 212.

The UE 115 modifies the counter value in response to receiving the second system information signal by incrementing the updated counter value based on a number of DL beams associated with at least one of the first system information signal or the second system information signal. The DL beams may be supported by the BS. The second system information signal may correspond to the system information signal 224 in FIG. 2. The UE 115 may reset the updated counter value by incrementing it by one, which is the number of DL beams associated with at least one of the first system information signal or the second system information signal. Accordingly, the UE 115 resets the updated counter value to seven (six plus one). Each time the UE 115 receives a system information signal while the counter is outstanding, the UE may modify the counter value by incrementing the updated counter value based on the number of DL beams associated with at least one of the first system information signal or the second system information signal. The UE 115 may continue to monitor for a paging signal from the BS 105 while the counter is outstanding (e.g., is not zero). The UE 115 continues to decrement the counter value as shown in FIG. 7 until the counter value is zero, at which point the counter expires. The UE 115 ceases monitoring for a paging signal in response to the expiration of the counter.

In FIG. 5, the UE 115 monitors for a paging signal during twelve PDCCH occasions before the counter expires. In FIG. 6, the UE 115 monitors for a paging signal during ten PDCCH occasions before the counter expires. In FIG. 7, the UE 115 monitors for a paging signal during eleven PDCCH occasions before the counter expires. As can be observed from FIGS. 5, 6, and 7, the counter value is modified to allow the UE 115 to extend a duration of the grace period where the UE 115 may monitor for PDCCH. The grace period extension accounts for the BS 105 having to prioritize a system information signal over a paging signal upon acquiring a COT in the channel. In some aspects, the initial value of the counter may be dependent on channel congestion (e.g., the congestion of the channel). For example, if the channel is congested, the UE 115 may configure the counter with a higher initial value to accommodate for the amount of traffic the BS 105 may transmit (e.g., system information).

Figure 8:
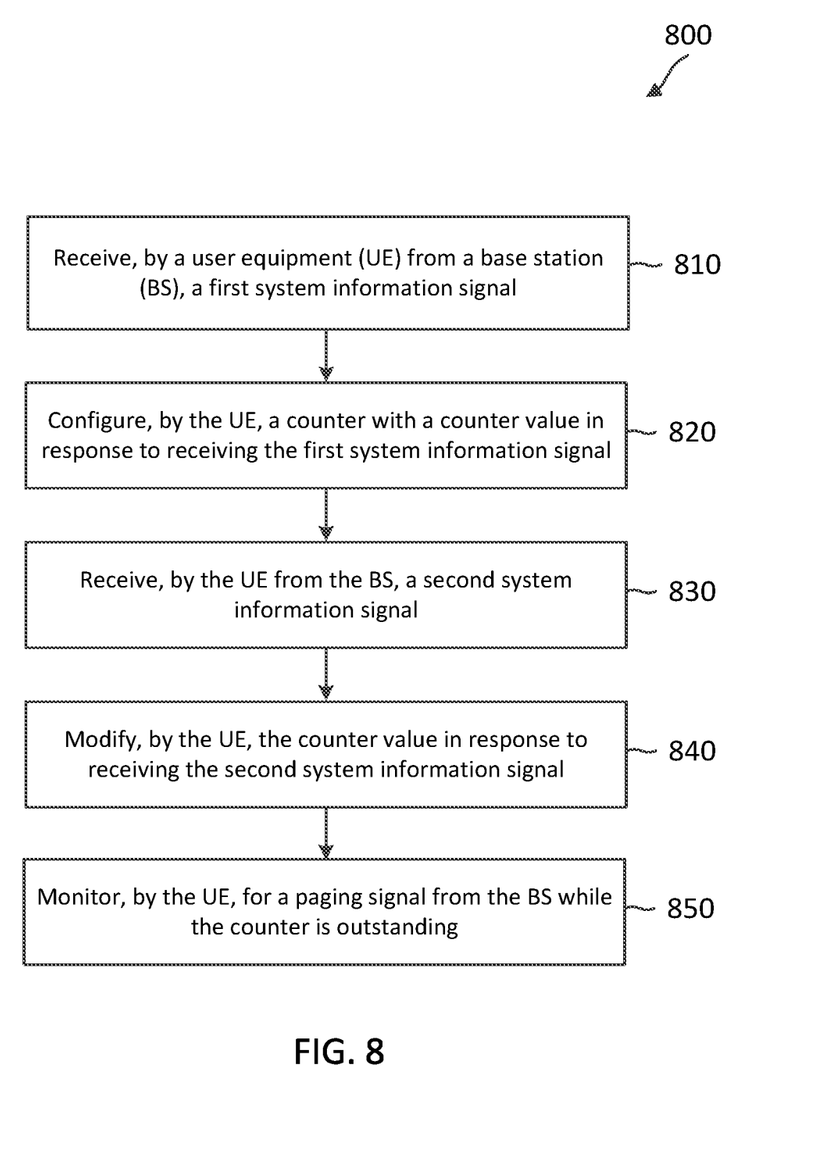
FIG. 8 is a flow diagram of a method of wireless communication according to one or more aspects of the present disclosure.

FIG. 8 is a flow diagram of a method 800 of wireless communication according to one or more aspects of the present disclosure. Blocks of the method 800 can be executed by a computing device (e.g., a processor, processing circuit, and/or other suitable component) of a wireless communication device, such as the UE 115. As illustrated, the method 800 includes a number of enumerated blocks, but aspects of the method 800 may include additional blocks before, after, and in between the enumerated block. In some aspects, one or more of the enumerated blocks may be omitted or performed in a different order.

At block 810, the method 800 includes receiving, by a user equipment (UE) from a base station (BS), a first system information signal. The first system information signal may be, for example, PDCCH for a SIB. The serving cell signal 222 may be similar to the first system information signal. In some instances, the UE may utilize one or more components, such as the processor 302, the memory 304, the system information module 307, the counter module 308, the paging module 309, the transceiver 310, the modem 312, and the one or more antennas 316, to receive the first system information signal. The first system information signal may be any system information whose PDCCH is identified by SI-RNTI. For example, the first system information signal may be a first serving cell signal from the BS, RMSI, SSB, SIB, etc.

At block 820, the method 800 includes configuring, by the UE, a counter with an initial counter value in response to receiving the first system information signal. In some instances, the UE may utilize one or more components, such as the processor 302, the memory 304, the system information module 307, the counter module 308, the paging module 309, the transceiver 310, the modem 312, and the one or more antennas 316, to configure a counter with an initial counter value in response to receiving the first system information signal. The UE may configure the counter with the initial counter value by, for example, receiving the initial counter value from the BS, configuring the counter with a reference value that is hard-coded at the UE, or configuring the counter with a value based on a number of DL beams associated with at least one of the first system information signal or the second system information signal.

At block 830, the method 800 includes receiving, by the UE from the BS, a second system information signal. The second system information signal may be, for example, a second PDCCH for a second SIB. In some instances, the UE may utilize one or more components, such as the processor 302, the memory 304, the system information module 307, the counter module 308, the paging module 309, the transceiver 310, the modem 312, and the one or more antennas 316, to receive the second system information signal. The UE may receive the second system information signal by receiving scheduling information for a first SIB1 and may receive the second system information signal by receiving scheduling information for a second SIB1.

At block 840, the method 800 includes modifying, by the UE, the counter value of the counter in response to receiving the second system information signal. In some instances, the UE may utilize one or more components, such as the processor 302, the memory 304, the system information module 307, the counter module 308, the paging module 309, the transceiver 310, the modem 312, and the one or more antennas 316, to modify the counter value of the counter in response to receiving the second system information signal. The UE may modify the counter value by, for example, resetting the updated counter value to the initial counter value, resetting the updated counter value to the current counter value, or incrementing the updated counter value based on a number of DL beams associated with at least one of the first system information signal or the second system information signal.

At block 850, the method 800 includes monitoring, by the UE, for a paging signal from the BS while the counter is outstanding. In some instances, the UE may utilize one or more components, such as the processor 302, the memory 304, the system information module 307, the counter module 308, the paging module 309, the transceiver 310, the modem 312, and the one or more antennas 316, to monitor for the paging signal from the BS while the counter is outstanding. The paging signal may be at least one of scheduling for a paging message or the paging messing. For example, the UE may monitor for a paging schedule in a Type-0 PDCCH search space and/or a Type-2 PDCCH search space until the counter expires.

Additionally, the UE may receive a third system information signal from the BS and modify the counter value in response to receiving the third system information signal. The UE may cease to monitor for a paging signal from the BS when the counter expires. For example, the UE may enter a power saving state (e.g., DRX sleep state) in response to ceasing to monitor for the paging signal. If the UE receives the paging signal from the BS while the counter is outstanding, the UE may cease to monitor for the paging signal from the BS in response to receiving the paging signal.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication, comprising:
receiving, by a user equipment (UE) from a base station (BS), a first system information signal;
configuring, by the UE, a counter with an initial counter value in response to receiving the first system information signal;
receiving, by the UE from the BS, a second system information signal;
modifying, by the UE, the counter value of the counter in response to receiving the second system information signal, wherein the modifying the counter value includes at least one of:
resetting the updated counter value to the initial counter value;
resetting the updated counter value to the current counter value; or
incrementing the updated counter value based on a number of downlink (DL) beams associated with at least one of the first system information signal or the second system information signal; and monitoring, by the UE, for a paging signal from the BS while the counter is outstanding.

2. The method of claim 1, wherein monitoring for the paging signal includes
performing, by the UE, one or more physical downlink control channel (PDCCH) monitoring occasions, the method further comprising
for each performed PDCCH monitoring occasion before receiving the second system information signal, updating, by the UE, the counter value by decrementing a current counter value of the counter by one.

3. The method of claim 2, wherein modifying the counter value includes resetting the updated counter value to the initial counter value.

4. The method of claim 2, wherein modifying the counter value includes resetting the updated counter value to the current counter value.

5. The method of claim 2, wherein modifying the counter value includes incrementing the updated counter value based on a number of downlink (DL) beams associated with at least one of the first system information signal or the second system information signal.

6. The method of claim 1, comprising:
ceasing, by the UE, to monitor for the paging signal from the BS when the counter expires.

7. The method of claim 6, comprising:
entering, by the UE, a power saving state in response to ceasing to monitor for the paging signal.

8. The method of claim 7, wherein the power saving state is a discontinuous reception (DRX) sleep state.

9. The method of claim 1, wherein monitoring for the paging signal includes monitoring, by the UE, for a paging schedule in a Type-0 PDCCH search space until the counter expires.

10. The method of claim 1, wherein monitoring for paging includes monitoring, by the UE, for a paging schedule in a Type-0 PDCCH search space and in a Type-2 PDCCH search space until the counter expires.

11. The method of claim 1, wherein receiving the first system information signal includes receiving a first serving cell signal from the BS.

12. The method of claim 1, wherein receiving the first system information signal includes receiving a schedule for first system information, and wherein receiving the second system information signal includes receiving a schedule for second system information.

13. The method of claim 1, wherein receiving the first system information signal includes receiving PDCCH for a first system information block 1 (SIB1), and wherein receiving the second system information signal includes receiving PDCCH for a second SIB1.

14. The method of claim 1, wherein receiving the paging signal includes receiving a schedule for a paging message.

15. The method of claim 1, further comprising:
receiving the initial counter value from the BS.

16. The method of claim 1, wherein configuring the counter with the initial counter value includes configuring the counter with a reference value.

17. The method of claim 1, wherein configuring the counter with the initial counter value includes configuring the counter with a value based on a number of DL beams associated with at least one of the first system information signal or the second system information signal.

18. The method of claim 1, comprising:
receiving, by the UE from the BS, a third system information signal; and
modifying, by the UE, the counter value in response to receiving the third system information signal.

19. The method of claim 1, comprising:
receiving, by the UE from the BS, the paging signal based on the monitoring for the paging signal while the counter is outstanding; and
ceasing, by the UE, to monitor for the paging signal from the BS in response to receiving the paging signal.

20. An apparatus comprising:
a transceiver configured to:
receive, by a user equipment (UE) from a base station (BS), a first system information signal; and
receive, by the UE from the BS, a second system information signal; and
a processor configured to:
configure, by the UE, a counter with an initial counter value in response to receiving the first system information signal;
modify, by the UE, the counter value of the counter in response to receiving the second system information signal, wherein the processor is configured to modify the counter value by performing at least one of:
resetting the updated counter value to the initial counter value;
resetting the updated counter value to the current counter value; or
incrementing the updated counter value based on a number of DL beams associated with at least one of the first system information signal or the second system information signal; and
monitor, by the UE, for a paging signal from the BS while the counter is outstanding.

21. The apparatus of claim 20, wherein the processor is configured to:
perform, by the UE, one or more physical downlink control channel (PDCCH) monitoring occasions; and
update, by the UE, the counter value by decrementing a current counter value of the counter by one for each performed PDCCH monitoring occasion before the transceiver receives the second system information signal.

22. The apparatus of claim 20, wherein the processor is configured to:
determine, by the UE, that the counter has expired; and
cease, by the UE, to monitor for the paging signal from the BS when the counter expires.

23. The apparatus of claim 22, wherein the processor is configured to:
enter, by the UE, a power saving state in response to ceasing to monitor for the paging signal, wherein the power saving state is a discontinuous reception (DRX) sleep state.

24. The apparatus of claim 20, wherein the processor is configured to monitor, by the UE, for the paging signal in at least one of a Type-0 PDCCH search space or a Type-2 PDCCH search space until the counter expires.

25. The apparatus of claim 20, wherein the transceiver is configured to receive the first system information signal by receiving a first serving cell signal from the BS.

26. The apparatus of claim 20, wherein the processor is configured to configure the counter with at least one of:
a reference value; or
a value based on a number of DL beams associated with at least one of the first system information signal or the second system information signal.

27. The apparatus of claim 20,
wherein the transceiver is configured to receive, by the UE from the BS, a third system information signal; and
wherein the processor is configured to modify, by the UE, the counter value in response to receiving the third system information signal.

28. The apparatus of claim 20,
wherein the transceiver is configured to receive, by the UE from the BS, the paging signal based on the monitoring for the paging signal while the counter is outstanding; and
wherein the processor is configured to cease, by the UE, to monitor for the paging signal from the BS in response to receiving the paging signal.

29. An apparatus, comprising:
means for receiving a first system information signal from a base station (BS);
means for a counter with an initial counter value in response to receiving the first system information signal;
means for receiving a second system information signal from the BS;
means for modifying the counter value of the counter in response to receiving the second system information signal, wherein the means for modifying the counter value comprises at least one of:
  means for resetting the updated counter value to the initial counter value;
  means for resetting the updated counter value to the current counter value; or
  means for incrementing the updated counter value based on a number of DL beams associated with at least one of the first system information signal or the second system information signal; and
means for monitoring for a paging signal from the BS while the counter is outstanding.

* * * * *